Figure 1:
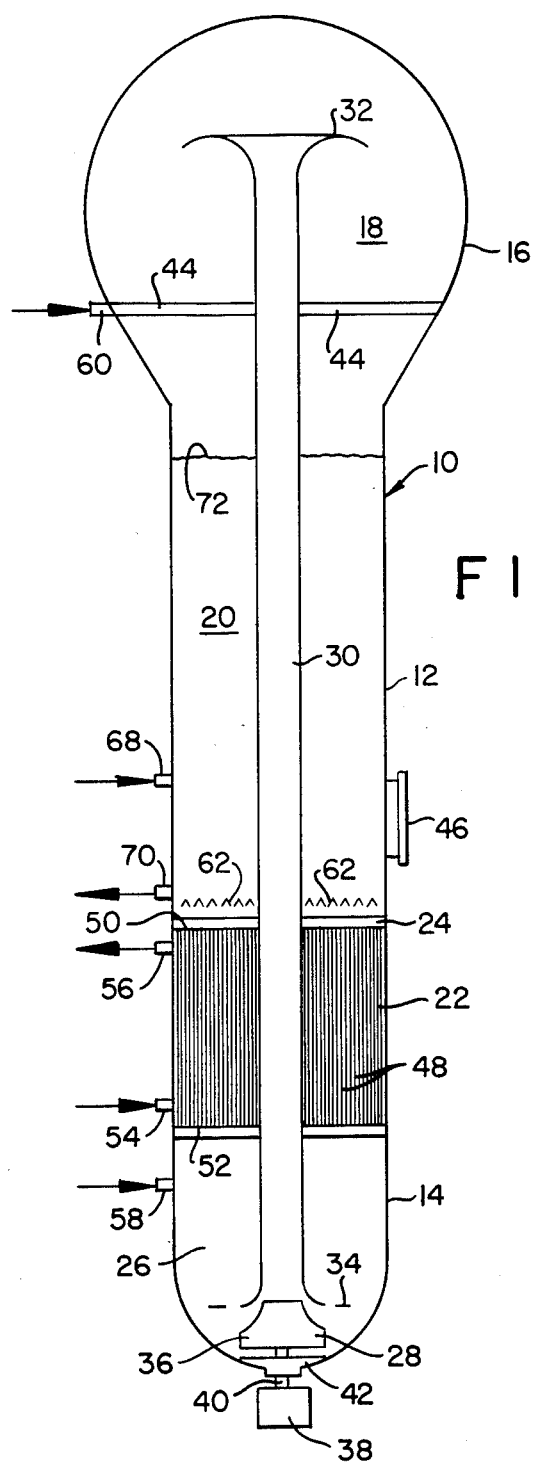

United States Patent [19]

Brod et al.

[11] Patent Number: 4,557,904

[45] Date of Patent: Dec. 10, 1985

[54] INTEGRAL REACTOR APPARATUS

[75] Inventors: William B. Brod; George H. Coppala; Delbert L. Olds, all of St. Albans, W. Va.

[73] Assignee: Union Carbide Corporation, Danbury, Conn.

[21] Appl. No.: 593,045

[22] Filed: Mar. 26, 1984

[51] Int. Cl.⁴ .............................................. F27B 15/16
[52] U.S. Cl. .................................. 422/146; 422/138; 526/68; 526/88
[58] Field of Search ....................... 422/138, 146, 147; 526/68, 88; 528/271

[56] References Cited

U.S. PATENT DOCUMENTS

| | | | |
|---|---|---|---|
| 2,488,406 | 11/1949 | Hirsch | 422/146 X |
| 2,606,144 | 8/1952 | Leffer | 422/146 X |
| 2,689,267 | 9/1954 | Rollman | 422/138 X |
| 4,041,088 | 8/1977 | Bach et al. | 526/88 X |
| 4,255,542 | 3/1981 | Brown et al. | 526/88 |
| 4,383,095 | 5/1983 | Goeke et al. | 526/88 |
| 4,403,650 | 9/1983 | Klaren | 422/146 X |
| 4,427,053 | 1/1984 | Klaren | 422/146 X |

FOREIGN PATENT DOCUMENTS

| | | | |
|---|---|---|---|
| 871193 | 5/1971 | Canada. | |
| 89691 | 9/1983 | European Pat. Off. | 526/68 |

Primary Examiner—Richard L. Chiesa
Attorney, Agent, or Firm—Clement J. Vicari

[57] ABSTRACT

Integral apparatus is disclosed for fluidized bed reaction systems wherein one or more of the following system component elements are positioned in a unitary reactor body: cooler means, compressor means and fluid recycle conduit means. Such cooler means also serve as gas distributor means acting to support the fluidized bed.

10 Claims, 3 Drawing Figures

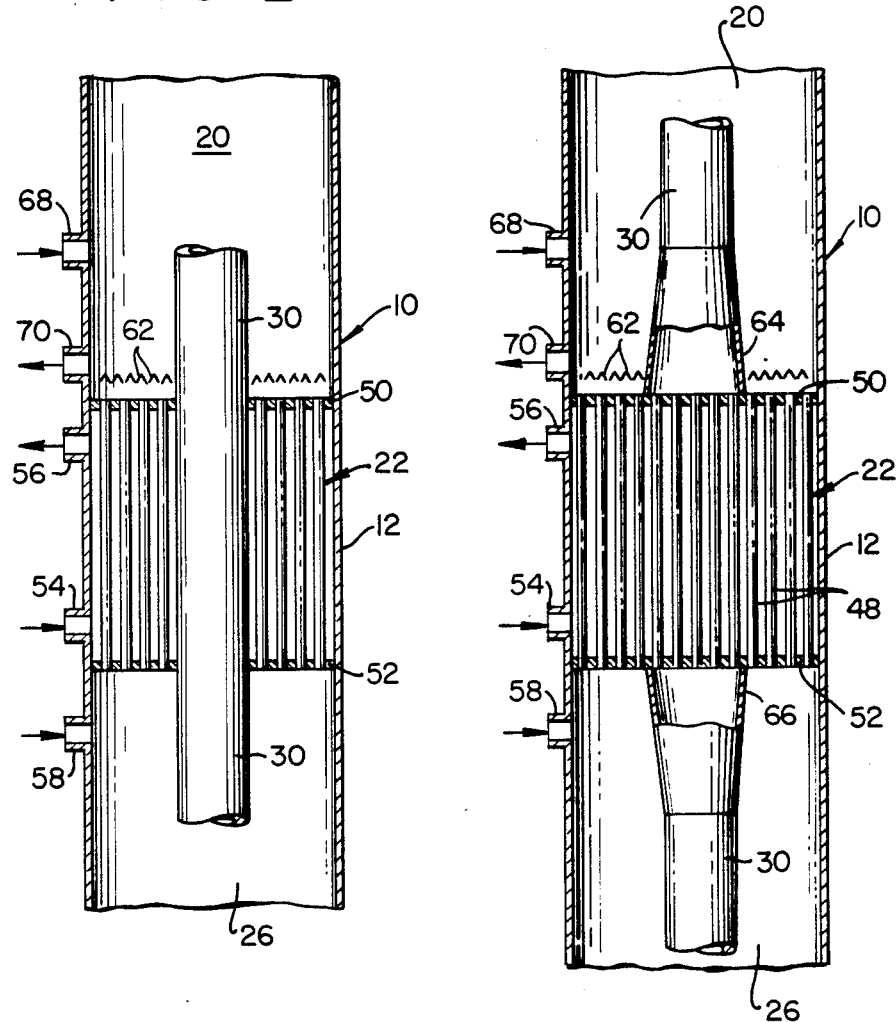

INTEGRAL REACTOR APPARATUS

DESCRIPTION OF THE INVENTION

The present invention relates to improved fluidized bed reaction system apparatus.

In fluidized bed reaction systems for exothermic polymerization or exothermic reactions using the fluidizing medium to remove the heat of reaction (as well as provide circulation of reactants), traditionally, the fluidizing media cycle is external to the reactor and requires large-sized piping, a pressure-containing circulating compressor, and heat exchanger(s) before or after (or both) the compressor. Additionally, a gas distributor plate having a significant pressure-drop, is required at the fluidized bed inlet to assure uniform distribution of the fluidizing media.

Each component of the external cycle requires support or foundation and independent installation. Also, considerable space is required for these components, particularly with large reactors.

Thus, improved apparatus may be employed for heat removal and circulation of reactants in either an exothermic polymerization reaction or other chemical reaction of the non-polymerization type wherein removal and/or reactant circulation is desired.

In accordance with the present invention, integral apparatus is provided for fluidized bed reaction systems comprising: a reactor having a disentrainment zone near one end thereof, a compression-diffusion zone near the other end thereof and a fluidized bed reaction zone therebetween; suction recycle fluid conduit means fixedly supported within the reactor and provided for the inlet flow of recycle fluid at one end thereof positioned in the disentrainment zone and discharge flow of recycle fluid at the other end thereof positioned in the compression-diffusion zone; and single, integral cooler and gas distributor plate means positioned in the reactor near the lower end thereof, the cooler means being in thermal contact with the discharge recycle fluid.

Thus, the invention provides a single, integral pressure containing vessel for the fluidized bed reactor and apparatus cycle. The combination of one or preferably more of the following system component elements into a single, integrated fluidized bed system comprises:

1. Use of an integral heat exchanger (cooler) below and serving to support the fluidized bed that functions as the gas distributor means for the fluidized bed as well as a heat exchanger. This arrangement of the heat exchanger has the added advantage of preventing disentrainment of any liquid condensed from the cycle.

2. Use of a single, pressure-containing vessel for the fluidized bed reaction, heat removal and fluidizing cycle. An alternative of using a flanged-tubesheet heat exchanger, with an independent shell, is also provided.

3. Use of a central or axial return pipe (through the fluidized bed) to provide a conduit for cycle gas to flow from above the fluidized bed directly to the compression-diffusion zone below the fluidized bed and cooling means.

4. Alternatively, use of the bottom head of the reactor as the pressure-containing casing of the cycle compressor is also disclosed. In the drawings:

FIG. 1 is an elevation sectional view showing schematically integral reactor apparatus embodying the present invention;

FIG. 2 is a partial sectional view of one embodiment of cooling means and suction recycle conduit means employable in the reactor of FIG. 1, in accordance with one aspect of the current invention; and FIG. 3 is a partial sectional view of another embodiment of cooling means and suction recycle conduit means employable in the reactor of FIG. 1, in accordance with another aspect of the current invention.

Referring specifically to the embodiment of the apparatus of FIGS. 1 and 2 of the drawings, an integral reactor 10 is provided having generally cylindrical, uniform shape along the central and lower portion of its body, 12 and 14, respectively, and an enlarged diameter, preferably domed top portion 16. The preferred domed top portion 16 provides a disentrainment zone 18 at and near the upper end of reactor 10. A fluidized bed zone 20 is provided below disentrainment zone 18. Internal cooling means 22 is provided below the fluidized bed zone, the top surface 24 of such cooling means 22 providing the gas distributor function which serves to support the fluidized bed above.

A compression-diffusion zone 26 is provided at the lower end of reactor 12 and compressor means 28 are positioned in the vicinity of the base of the compression-diffusion zone 26.

Suction recycle fluid conduit 30 is fixedly positioned centrally and axially through the major portion of the length of reactor 10 from a flared inlet 32 at the upper end thereof in disentrainment zone 18 to the lower end thereof which terminates in compressor means 28. Compressor means 28 has a rotary impellar 36 cooperating with diffuser ring 34 and driven by compressor motor 38 (external to reactor 10) through shafting 40.

Flange 42 is provided in the base of the reactor for removal of compressor components and gaining access to the vicinity of the diffuser ring and of suction recycle fluid conduit means 30.

In the embodiment of FIGS. 1 and 2, suction recycle fluid conduits pass through cooler means 22 without any fluid flow therebetween and with thermal heat contact between the coolant of the cooling means and the down-flowing passing through recycle conduit 30.

Suction recycle conduit means 30 is supported by the walls of the reactor through support braces 44 near the upper end thereof and cooler means 22, near the lower end thereof.

A manway or the like 46 is provided through the walls of the reactor 10 in position above cooler means 22 to provide access for maintenance, when necessary.

Cooler means 22 comprises a large plurality of spaced fluid conduits 48 passing vertically through cooler means 22 and secured as by welding at the upper and lower ends, respectively, by annular tube sheets 50 and 52.

Inlet and outlet coolant conduits 54 and 56, respectively, are provided for the passage of any suitable coolant medium through cooler means 22 in the common space between the plurality of fluid flow conduits 48.

Inlet conduits may be provided, as at 58 and 60, for the passage of reactant (such as make-up monomer and other addition agents) to the reactor. Inlet conduit 58 may be employed to introduce reactant into compression-diffusion zone 26. Inlet conduit 60 may be employed to introduce reactant through support brace means 44 directly into the interior of suction recycle fluid conduit 30 near the upper end thereof.

A plurality of angle irons 62 or the like may be preferably secured at a stand-off position above each passage of cooler means 22 and gas distributor tube sheet means 50 to prevent the back-flow of solid particulate material from the fluidized bed through the passages.

In the embodiment of apparatus zone in FIG. 3 of the drawings, the suction recycle fluid conduit 30 does not physically pass, as such, through cooler means 22, as in the FIG. 2 embodiment. The flared ends, 64 and 66, of the fluid conduit means 30 are secured, as by welding, to the upper and lower tube sheets 50 and 52 of cooler means 22 and communicate with the plurality of passages 48 of the cooler means 22 as are spanned by the flared ends 64 and 66 of the fluid conduit 30. The remaining cooler fluid conduits are available for the passage of up-flowing fluid therethrough, as shown in the embodiment of FIG. 2.

In both the embodiments of FIGS. 1 and 2 and that of FIG. 3, inlet means is provided through the walls of reactor 10 and 68 for the introduction of reactor material into the fluidized bed zone. In addition, product removal means is provided at 70 through the walls of reactor 10 in each of the embodiments shown.

In operation, improved integral apparatus of the present invention employs a fluid flow which is up-flowing from the compression-diffusion zone 26 through the passages 48 of cooler means 22 to the fluidized bed zone 20 where particles of the fluidized bed are suspended up to the level of 72 shown in FIG. 1. The upward flow of fluid continues through the reactor disentrainment zone 18 where the separation of solid from fluid is effected. The fluid stream passes downwardly through the flared inlet 32 through the suction recycle fluid conduit means 30 under the influence of the compressor unit near the base of the reactor. Exhaust flow from fluid conduit means 30, through the compressor 36, the diffuser ring 34 completing the fluid recycle cycle.

Such integral reactor apparatus provides for the alternative addition of make-up monomer through conduit 58 or conduit 60 directly into the suction recycle conduit 30.

Units of integral reactor apparatus embodying the present invention have been designed having reactor heights up to 100 feet, reactor fluidized bed length of 44 feet and with a 14 foot diameter, a cooler means about 20 feet in height (of the FIG. 1 embodiment) and employing approximately 1000 fluid flow conduits approximately 1-inch in diameter, having 1.5-inch centers. Such apparatus was designed for the polymerization of alpha-olefins and employs a recycle tube velocity greater than 50 ft/sec.

The benefits of the apparatus of the present invention are reduced investment and operating costs for fluid bed reactors. Specifically, this design will:

(a) Minimize compressor energy requirements by reducing gas cycle pressure drop.

(b) Facilitate modular design of the reaction system.

(c) Allow shop fabrication and assembly of the entire reactor, compressor, and cooler system.

(d) Eliminate the compressor casing and foundation.

(e) Eliminate external compressor piping, expansion joints and support structures.

(f) Eliminate separate cooler foundation.

(g) Minimize engineering service requirements.

What is claimed is:

1. Integral apparatus for fluidized bed reaction systems comprising: a reactor having a disentrainment zone near one end thereof, a compression-diffuser zone near the other end thereof and a fluidized bed reaction zone therebetween; suction recycle fluid conduit means fixedly supported within said reactor extending along the entire length through an interior portion of said fluidized bed and provided for the inlet flow of recycle fluid at one end thereof positioned in said disentrainment zone and discharge flow of recycle fluid at the other end thereof positioned in said compression-diffuser zone; and cooler and gas distributor means positioned in said reactor near the lower end thereof, said cooler means being in thermal contact with said discharge recycle fluid.

2. Apparatus in accordance with claim 1, wherein said cooler means also serves as gas distributor means and acts to support said fluidized bed.

3. Apparatus in accordance with claim 1, wherein said disentrainment zone has a diameter exceeding that of the other zones of said reactor.

4. Apparatus in accordance with claim 1, wherein compressor means is additionally positioned in said reactor at said other end of said suction recycle fluid conduit means.

5. Apparatus in accordance with claim 1, wherein the passages of said gas distributor means are provided with stand-off, protective means positioned thereover to prevent the back-flow of solid particular material from said fluidized bed therethrough.

6. Apparatus for fluidized bed reaction systems comprising: a reactor having a disentrainment zone near one end thereof, a compression-diffuser zone near the other end thereof and a fluidized bed reaction zone therebetween; suction recycle fluid conduit means fixedly supported within said reactor extending along the entire length through an interior portion of said fluidized bed and provided for the inlet flow of recycle fluid at one end thereof positioned in said disentrainment zone and discharge flow of recycle fluid at the other end thereof positioned in said compression-diffuser zone; single, integral cooler and gas distributor means positioned in said reactor near the lower end thereof, said cooler means being in thermal contact with said suction recycle fluid conduit means; and compressor means positioned in said reactor at said other end of said suction recycle fluid conduit means.

7. Apparatus in accordance with claim 6, wherein said disentrainment zone has a diameter exceeding that of the other zones of said reactor.

8. Apparatus in accordance with claim 6, wherein the passages of said cooler and gas distributor means are provided with stand-off, protective means positioned thereover to prevent the back-flow of solid particulate material from said fluidized bed therethrough.

9. Apparatus for fluidized bed reaction systems comprising: a reactor having a disentrainment zone near one end thereof, a compression-diffuser zone near the other end thereof and a fluidized bed reactor zone therebetween; suction recycle fluid conduit means fixedly supported within said reactor extending along the entire length through an interior portion of said fluidized bed and provided for the inlet flow of recycle fluid at one end thereof positioned in said disentrainment zone and discharge flow or recycle fluid at the other end thereof positioned in said compression-diffuser zone; single, integral cooler and gas distributor means positioned in said reactor near the lower end thereof, said cooler means being in thermal contact with said suction recycle fluid conduit means; compressor means positioned in said reactor at said other end of said suction recycle fluid conduit means; fluid inlet means in communication with either the interior of said suction recycle conduit means or said compression diffuser zone for introducing make-up fluid reactant to said reactor; and product discharge means passing through the wall of said reactor in the vicinity of said fluidized bed for removing reaction product.

10. Apparatus in accordance with claim 9, wherein the passages of said cooler and gas distributor means are provided with stand-off, protective means positioned thereover to prevent the back-flow of solid particulate material from said fluidized bed therethrough.

* * * * *

UNITED STATES PATENT AND TRADEMARK OFFICE
CERTIFICATE OF CORRECTION

PATENT NO. : 4,557,904
DATED : Dec. 10, 1985
INVENTOR(S) : W.B. Brod, D.L. Olds

It is certified that error appears in the above-identified patent and that said Letters Patent is hereby corrected as shown below:

Col. 2, line 41, after "down-flowing" insert the word -- fluid --.

Signed and Sealed this

Eighth Day of April 1986

[SEAL]

Attest:

DONALD J. QUIGG

Attesting Officer

Commissioner of Patents and Trademarks